(12) United States Patent
Jing

(10) Patent No.: US 11,588,618 B2
(45) Date of Patent: Feb. 21, 2023

(54) TRANSACTION PROCESSING METHOD, APPARATUS, DEVICE AND SYSTEM FOR MULTI-CHAIN SYSTEM

(71) Applicant: BAIDU INTERNATIONAL TECHNOLOGY (SHENZHEN) CO., LTD., Guangdong (CN)

(72) Inventor: Bo Jing, Guangdong (CN)

(73) Assignee: BAIDU INTERNATIONAL TECHNOLOGY (SHENZHEN) CO., LTD., Shenzhen (CN)

(*) Notice: Subject to any disclaimer, the term of this patent is extended or adjusted under 35 U.S.C. 154(b) by 215 days.

(21) Appl. No.: 17/099,431

(22) Filed: Nov. 16, 2020

(65) Prior Publication Data
US 2021/0314138 A1 Oct. 7, 2021

(30) Foreign Application Priority Data
Apr. 7, 2020 (CN) .......................... 202010264756.2

(51) Int. Cl.
H04L 29/06 (2006.01)
H04L 9/06 (2006.01)
G06F 16/182 (2019.01)
H04L 9/08 (2006.01)
(Continued)

(52) U.S. Cl.
CPC ........ H04L 9/0637 (2013.01); G06F 16/1837 (2019.01); H04L 9/0643 (2013.01); H04L 9/085 (2013.01); H04L 9/3255 (2013.01); H04L 9/50 (2022.05)

(58) Field of Classification Search
None
See application file for complete search history.

(56) References Cited

FOREIGN PATENT DOCUMENTS

| CN | 107005574 A | * | 8/2017 | ............ G06F 21/31 |
|----|-------------|---|--------|------------------------|
| CN | 107909369 A | * | 4/2018 | |
| CN | 107909369 A | | 4/2018 | |

(Continued)

OTHER PUBLICATIONS

European Patent Application No. 20212276.8 Search and Opinion dated May 25, 2021, 73 pages.
(Continued)

Primary Examiner — Andrew J Steinle
(74) Attorney, Agent, or Firm — Lathrop GPM LLP

(57) ABSTRACT

Embodiments of the present disclosure provide a transaction processing method, apparatus, device and system for a multi-chain system. The multi-chain system includes a mainchain and at least one slave-chain, a multi-chain network of the multi-chain system includes a plurality of nodes, and each node is deployed with one or more of the mainchain and the slave-chains. The method is executed by a slave-chain node deployed with the slave-chain. The method includes: generating slave-chain blocks based on a slave-chain consensus mechanism, and storing the slave-chain blocks on the slave-chain; and in response to determining that a confirmation condition of the mainchain is met, transmitting a slave-chain block to be confirmed on the slave-chain to nodes of the mainchain, to request consensus nodes of the mainchain to confirm the slave-chain block to be confirmed, and storing confirmation information of the slave-chain block to be confirmed on the mainchain.

18 Claims, 5 Drawing Sheets

(51) Int. Cl.
*H04L 9/32* (2006.01)
*H04L 9/00* (2022.01)

(56) References Cited

FOREIGN PATENT DOCUMENTS

| | | |
|---|---|---|
| CN | 109711842 A | 5/2019 |
| CN | 110351067 A | 10/2019 |
| CN | 111339114 A * | 6/2020 |

OTHER PUBLICATIONS

Zhang, Z, et al. "A Master-Slave Chain Architecture Model for Cross-Domain Trusted and Authentication of Power Services", Proceedings of the 2019 $7^{th}$ Intl Conference on Information Technology: IoT and Smart City, pp. 483-487.

* cited by examiner

TRANSACTION PROCESSING METHOD, APPARATUS, DEVICE AND SYSTEM FOR MULTI-CHAIN SYSTEM

CROSS REFERENCE TO RELATED APPLICATIONS

This application claims priority and benefits to of Chinese Application No. 202010264756.2, filed on Apr. 7, 2020, the entire content of which is incorporated herein by reference.

TECHNICAL FIELD

The present disclosure relates to a field of computer technologies, and especially to a field of blockchain technologies.

BACKGROUND

Currently, many popular blockchain systems adopt multi-chain architecture, such as fabric and super chain. In the multi-chain architecture, which is a blockchain network consisting of multiple nodes, at least some nodes are deployed with programs and data of a plurality of blockchains, and thus operation of the plurality of blockchains is supported. The plurality of blockchains may be parallel chains, or may include one mainchain and a plurality of slave-chains.

SUMMARY

In a first aspect, embodiments of the present disclosure provide a transaction processing method for a multi-chain system. The multi-chain system includes a mainchain and at least one slave-chain. A multi-chain network of the multi-chain system includes a plurality of nodes. Each node is deployed with one or more of the mainchain and the slave-chains. The method is executed by a slave-chain node deployed with the slave-chain, and the method includes: generating slave-chain blocks based on a slave-chain consensus mechanism, and storing the slave-chain blocks on the slave-chain; and in response to determining that a confirmation condition of the mainchain is met, transmitting a slave-chain block to be confirmed on the slave-chain to nodes of the mainchain, to request consensus nodes of the mainchain to confirm the slave-chain block to be confirmed, and storing confirmation information of the slave-chain block to be confirmed on the mainchain.

In a second aspect, embodiments of the present disclosure provide a transaction processing method for a multi-chain system. The multi-chain system includes a mainchain and at least one slave-chain. A multi-chain network of the multi-chain system includes a plurality of nodes. Each node is deployed with one or more of the mainchain and the slave-chains. The method is executed by a mainchain node deployed with the mainchain, and the method includes: generating a mainchain block based on a mainchain consensus mechanism; in response to obtaining a slave-chain block to be confirmed transmitted from a slave-chain node during generating the mainchain block, performing a confirmation operation on the slave-chain block to be confirmed; generating confirmation information based on a confirmed slave-chain block; and adding the confirmation information to the mainchain block, and storing the mainchain block on the mainchain.

In a third aspect, embodiments of the present disclosure provide an electronic device. The electronic device includes at least one processor and a memory communicatively connected to the at least one processor. The memory is stored with instructions executable by the at least one processor, and when the instructions are executed by the at least one processor, the at least one processor is caused to execute the transaction processing method for a multi-chain system in the first aspect or in the second aspect.

In a fourth aspect, embodiments of the present disclosure provide a non-transitory computer-readable storage medium stored with computer instructions, in which the computer instructions are configured to cause the computer to execute the transaction processing method for a multi-chain system according to any embodiment.

In a fifth aspect, embodiments of the present disclosure provide a multi-chain network deployed with a multi-chain system. The multi-chain network includes a mainchain and at least one slave-chain, the multi-chain network includes a plurality of nodes, each node is deployed with one or more of the mainchain and the slave-chains, and at least part of the nodes includes at least one processor and a memory communicatively connected to the at least one processor. The memory is stored with instructions executable by the at least one processor, and when the instructions are executed by the at least one processor, the at least one processor is caused to execute the transaction processing method for a multi-chain system according to any embodiment.

It is understood that the content described in this section is not intended to identify key or important features of the embodiments of the present disclosure, nor is it intended to limit the scope of the present disclosure. Additional features of the present disclosure will be easily understood through the following description.

BRIEF DESCRIPTION OF THE DRAWINGS

The accompanying drawings are used to better understand the solution, and do not constitute a limitation on the disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

Embodiments of the present disclosure provide a transaction processing method, apparatus, device and system for a multi-chain system and a medium, which are described below with reference to the accompanying drawings.

In order to clearly describe embodiments of the present disclosure, the multi-chain system is first described. In detail, the multi-chain system includes a mainchain and at least one slave-chain, a multi-chain network of the multi-chain system includes a plurality of nodes, and each node is deployed with one or more of the mainchain and the slave-chains. That is, each node may be deployed with the mainchain or may be deployed with at least one slave-chain, or may be deployed with both the mainchain and at least one slave-chain. The at least one slave-chain may be a parallel chain or a sidechain, which is not specifically limited in this embodiment. The deployment of mainchain or slave-chain means that the node is installed with programs and data that support operation of the blockchain. The programs and data include, for example, network communication protocols, consensus mechanism programs, incentive mechanism programs, and smart contracts.

Figure 1:
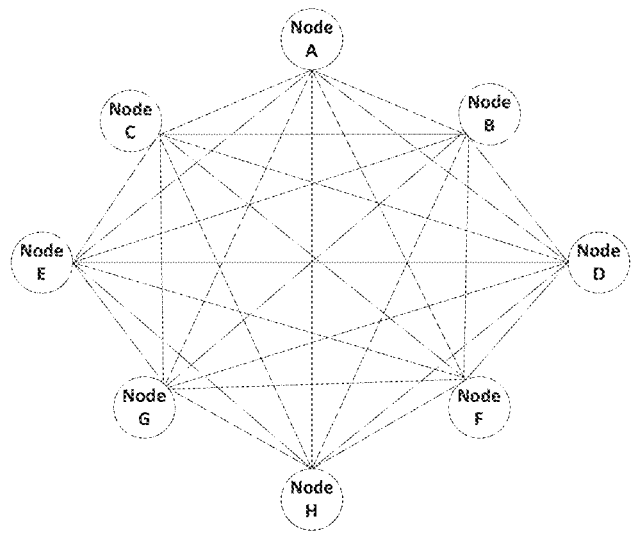
FIG. 1(a) is a schematic diagram of deploying a mainchain based on a plurality of nodes included in a multi-chain network according to an embodiment of the present disclosure.
FIG. 1(b) is a schematic diagram of deploying a first slave-chain based on the plurality of nodes included in the multi-chain network according to an embodiment of the present disclosure.
FIG. 1(c) is a schematic diagram of deploying a second slave-chain based on the plurality of nodes included in the multi-chain network according to an embodiment of the present disclosure.
Figure 1:
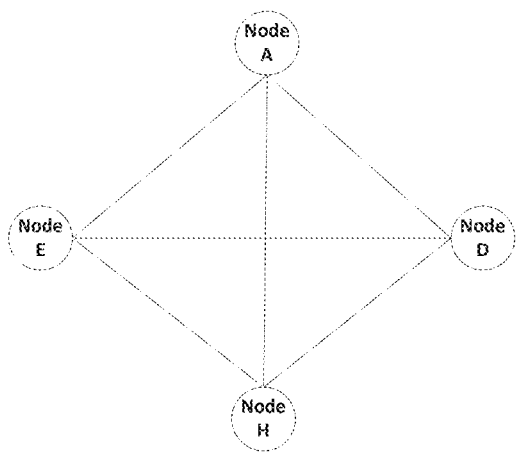
Figure 1:
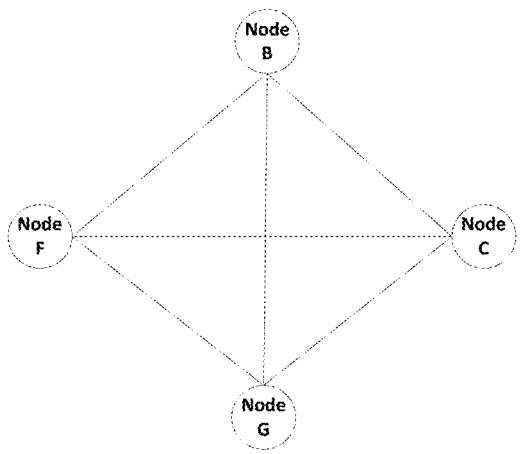

For example, as illustrated in FIGS. 1(*a*)-1(*c*), the multi-chain network of the multi-chain system includes 8 nodes, namely: node A, node B, node C, node D, node E, node F, node G and node H. A mainchain is deployed based on the above 8 nodes (as illustrated in FIG. 1(*a*)). A first slave-chain is deployed based on node A, node D, node E and node H (as illustrated in FIG. 1(*b*)). Meanwhile, a second slave-chain is deployed based on node B, node C, node F and node G (as illustrated in FIG. 1(*c*)).

For each blockchain, it is necessary to determine block generating nodes based on consensus mechanism in the business operation process, in which the block generating nodes are configured to generate blocks. In the network that supports the blockchain, nodes that are eligible to become the block generating nodes are called consensus nodes. The consensus nodes may be all or a part of participating nodes. The generated blocks need to be verified and confirmed by the consensus nodes before being written to the chain.

How to choose the consensus strategy for the blockchain system with multi-chain architecture is a problem to be solved. Since each node of the blockchain network may support a plurality of blockchains, if an overlap degree of the consensus nodes of respective blockchains is high, computing pressure of the consensus nodes is great, which affects overall performance of the blockchain system. If the overlap degree of the consensus nodes is low, reliability of a part of the blockchains decreases due to small number of consensus nodes.

Embodiment 1

The following describes the transaction processing method for the multi-chain system disclosed in embodiments of the present disclosure with the slave-chain node deployed with the slave-chain as an execution subject in the multi-chain system.

Figure 2:
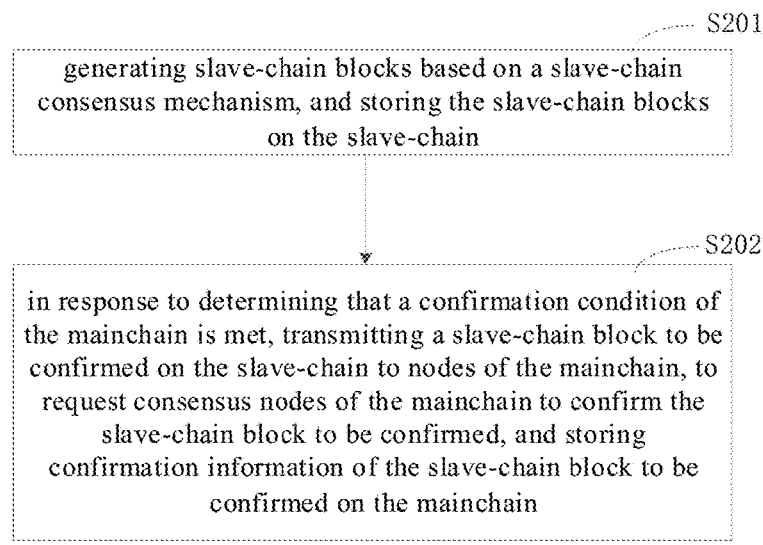
FIG. 2 is a flowchart of a transaction processing method for a multi-chain system according to Embodiment 1 of the present disclosure.

FIG. 2 is a flowchart of a transaction processing method for a multi-chain system according to Embodiment 1 of the present disclosure.

The transaction processing method for the multi-chain system provided by this embodiment may be executed by a transaction processing apparatus for a multi-chain system in the slave-chain node. The apparatus may be implemented by software and/or hardware, and may be configured in an electronic device. The method includes the following steps.

At S201, slave-chain blocks are generated based on a slave-chain consensus mechanism, and the slave-chain blocks are stored on the slave-chain.

For example, the slave-chain may run a certain business function, and the user initiates a transaction request. The consensus nodes of the slave-chain determine block generating nodes in a current block generating period based on the slave-chain consensus mechanism, for example, Delegated proof of stake (DPOS). After the block generating nodes generate blocks, the block generating nodes transmit the blocks to other consensus nodes for verification, to confirm the currently generated slave-chain block and store the confirmed slave-chain block on the slave-chain.

At S202, in response to determining that a confirmation condition of the mainchain is met, a slave-chain block to be confirmed on the slave-chain is transmitted to nodes of the mainchain to request consensus nodes of the mainchain to confirm the slave-chain block to be confirmed, and store confirmation information of the slave-chain block to be confirmed on the mainchain.

In this embodiment, the slave-chain block needs to be further confirmed by the mainchain. However, the slave-chain block does not directly request the mainchain to confirm unconditionally. Rather, when the confirmation condition of the mainchain is met, the mainchain is then requested to confirm the slave-chain block. If a number of the generated slave-chain blocks reaches a preset number, or a number of blocks between the currently generated slave-chain block and the last slave-chain block determined by the mainchain reaches the preset number, the confirmation condition of the mainchain is met, which may be determined according to actual requirements, and is no described specifically herein. The preset number is set according to actual application requirements, such as 5 or 6.

For example, when the slave-chain block is generated and the confirmation condition of the mainchain is met, the slave-chain block is broadcasted to the mainchain as the slave-chain block to be confirmed by the slave-chain nodes, so that the slave-chain block to be confirmed is transmitted to the mainchain to be confirmed by the consensus nodes of the mainchain.

If the consensus nodes of the mainchain determine that the confirmation of the slave-chain block to be confirmed is successful, the confirmation information of the slave-chain block to be confirmed is stored in the mainchain. If the consensus nodes of the mainchain determine that the confirmation of the slave-chain block to be confirmed is unsuccessful (illegal), the mainchain discards the slave-chain block to be confirmed, and does not record the confirmation information of the slave-chain block to be confirmed. In this way, for the slave-chain blocks that have not been confirmed by the main chain, users who participate in transactions in the slave-chain find that the slave-chain blocks are not confirmed by the mainchain, and then question security of the transactions and gradually reduce the number of transactions in the slave-chain.

It is noted that, in this embodiment, when the slave-chain block to be confirmed is broadcasted to the mainchain, if the slave-chain node is deployed with the mainchain, the slave-chain block to be confirmed is directly broadcasted to the mainchain. If the slave-chain node itself is not deployed with the mainchain, another slave-chain node with the mainchain deployed is queried on the slave-chain, and the slave-chain block to be confirmed is broadcasted to the mainchain through the slave-chain node with the mainchain deployed.

In this embodiment, the confirmation information is information that represents the block to be confirmed. For example, the confirmation information may include a block identifier of the slave-chain block to be confirmed and a chain identifier of the slave-chain.

There are various ways to store the confirmation information in the mainchain. Optionally, the confirmation information of the slave-chain block to be confirmed is stored in the mainchain may be as follows. In detail, the block identifier and the chain identifier are used as two leaf nodes for determining Merkle Tree, and the block identifiers of the slave-chain blocks to be confirmed and the chain identifiers of other slave-chains are used as other leaf nodes for determining Merkle Tree. The Merkle Tree is stored in the block header of the mainchain. By storing the Merkle Tree in the block header of the mainchain, basis for subsequent transaction processing of a slave-chain account could be provided. The confirmation information includes the block identifier and chain identifier of the slave-chain block, so that the mainchain could confirm a plurality of slave-chains, and specifically determine which slave-chain block is confirmed by the mainchain, which could be used for retrospective query by the slave-chain. The confirmation information is stored in the way of determining the Merkle Tree, so that the confirmation information of the slave-chain blocks is comprehensively recorded, which is convenient for query. The confirmation information is stored in the block header of the mainchain, which is easily queried by the slave-chain nodes. For example, the slave-chain nodes obtain the confirmation information by only synchronizing the block header of the mainchain, without completely synchronizing all blocks of the mainchain.

Figure 3:
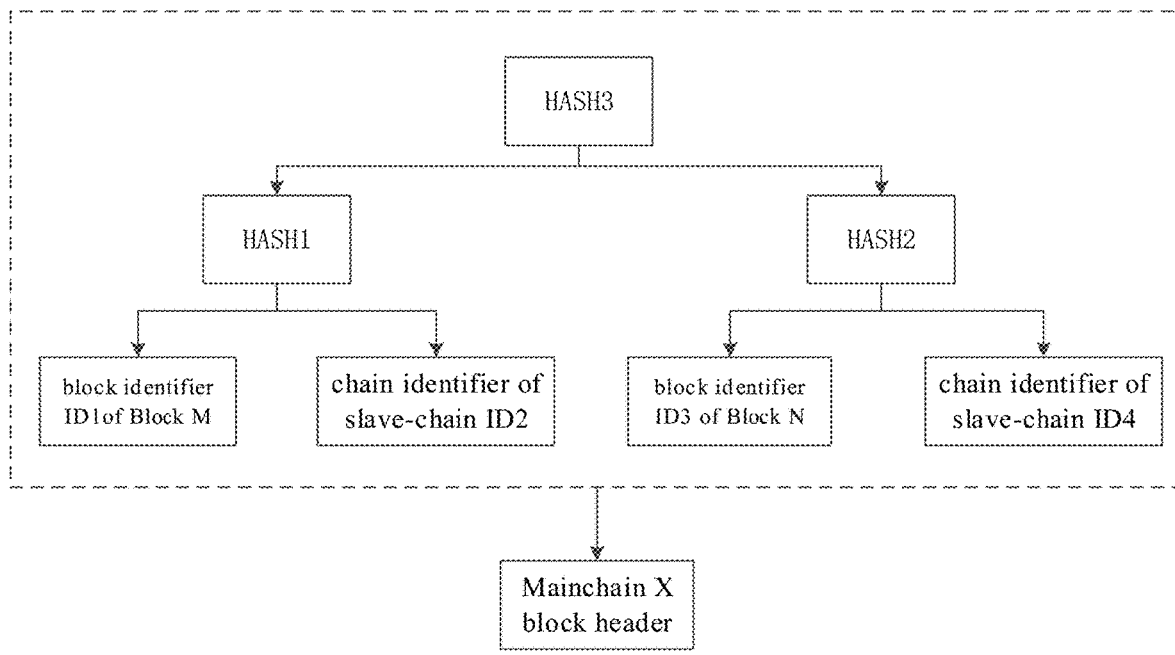
FIG. 3 is a schematic diagram of storing Merkle tree generated into a block header of the mainchain according to Embodiment 1 of the present disclosure.

For example, suppose that a block identifier of a slave-chain block to be confirmed M of a slave-chain is ID1 and a chain identifier of a slave-chain to which it belongs is ID2, a block identifier of a slave-chain block to be confirmed N of another slave-chain is ID3 and a chain identifier of a slave-chain to which it belongs is ID4, and a main chain is X, then a first hash value HASH1 is calculated based on ID1 and ID2, and a second hash value HASH2 is calculated based on ID3 and ID4. A third hash value HASH3 is then calculated according to HASH1 and HASH2, and finally HASH3 is used as a root node for determining Merkle Tree, and HASH1 and HASH2 are used as leaf nodes for determining Merkle Tree to obtain the confirmed Merkle Tree, and the confirmed Merkle Tree is stored in the block header of X as illustrated in FIG. 3.

In the transaction processing method for the multi-chain system according to embodiments of the present disclosure, the slave-chain blocks are generated based on the slave-chain consensus mechanism and stored on the slave-chain. In response to determining that the confirmation condition of the mainchain is met, the slave-chain block to be confirmed on the slave-chain is transmitted to the nodes of the mainchain to request the consensus nodes of the mainchain to confirm the slave-chain block to be confirmed, and the confirmation information of the slave-chain block to be confirmed is stored on the mainchain. Therefore, the consensus nodes of the mainchain confirm the slave-chain block to be confirmed generated by the slave-chain, thereby optimizing the consensus strategy in the multi-chain system. Since the slave-chain node requests the mainchain to confirm the slave-chain blocks only when the confirmation condition of the mainchain is met, the calculation pressure on the mainchain is reduced. The slave-chain and the mainchain do not need to use the same consensus nodes for confirmation, so that the calculation pressure of the consensus nodes is also reduced. The slave-chain nodes still need to be confirmed through the mainchain, so that the reliability of the operation of the slave-chain is guaranteed through the mainchain. This solution takes both the calculation pressure of the nodes of the multi-chain system and the reliability of the blockchains into account.

Based on the above embodiments, after the slave-chain block to be confirmed in the slave-chain is transmitted to the nodes of the mainchain to request the consensus nodes of the mainchain to confirm the slave-chain block to be confirmed, optionally, the method further includes: in response to determining that the slave-chain block on the slave-chain has a rollback requirement, prohibiting a rollback operation of the slave-chain block to be rolled back located before the last slave-chain block confirmed by the mainchain.

Optionally, if the slave-chain is bifurcated due to malicious attacks, it is determined that the slave-chain block in the slave-chain needs to be rolled back. Certainly, a certain or some slave-chain blocks needs to be rolled back due to other reasons. For example, there are two branches from the $i^{th}$ slave-chain block, the slave-chain block of one branch is confirmed by the mainchain, and the slave-chain block of the other branch is not confirmed by the mainchain, which is caused by attacks. Then although the other branch may form a long chain, the confirmed branch needs to be rolled back. However, during rollback, if the slave-chain block to be rolled back has been confirmed by the mainchain, the rollback operation of the slave-chain block to be rolled back is prohibited, thereby improving the security of the slave-chain block. Therefore, reliability of the transaction processing on the slave-chain is guaranteed by means of confirming by the mainchain. In particular, the slave-chain may be a newly built blockchain or a blockchain with fewer functional businesses, and thus the number of participating nodes is small, and the number of the users is small as well. For such a slave-chain, the number of the consensus nodes is small, it is easily for the consensus nodes to be maliciously manipulated to carry out a long-chain attack. As a result, normally processed transaction requests are rolled back, and the transaction processing of the user could not be guaranteed. By confirming the blocks of the slave-chain through the mainchain, the computing power of a large number of consensus nodes of the mainchain may be used to ensure that the confirmed slave-chain blocks could not be rolled back.

When the slave-chain initiates a long-chain attack, the attack cost is large due to encountering the computing power of the large amount of consensus nodes of the mainchain, thereby effectively reducing long-chain attack.

It is noted that in this embodiment, the slave-chain could not unilaterally roll back the slave-chain block that has been confirmed by the consensus nodes on the mainchain, unless the slave-chain block is rolled back by another consensus node on the mainchain.

Embodiment 2

Figure 4:
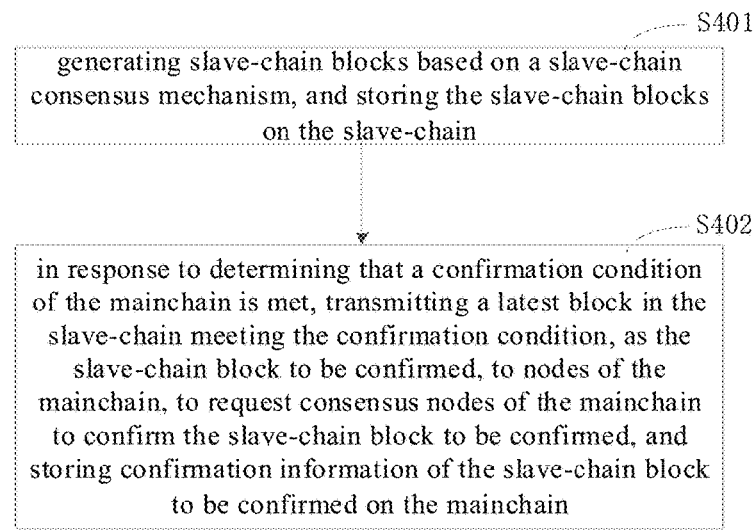
FIG. 4(a) is a flowchart of a transaction processing method for a multi-chain system according to Embodiment 2 of the present disclosure.
FIG. 4(b) is a schematic diagram of the mainchain confirming a block generated by a parallel chain K and a parallel chain J according to Embodiment 2 of the present disclosure.
Figure 4:
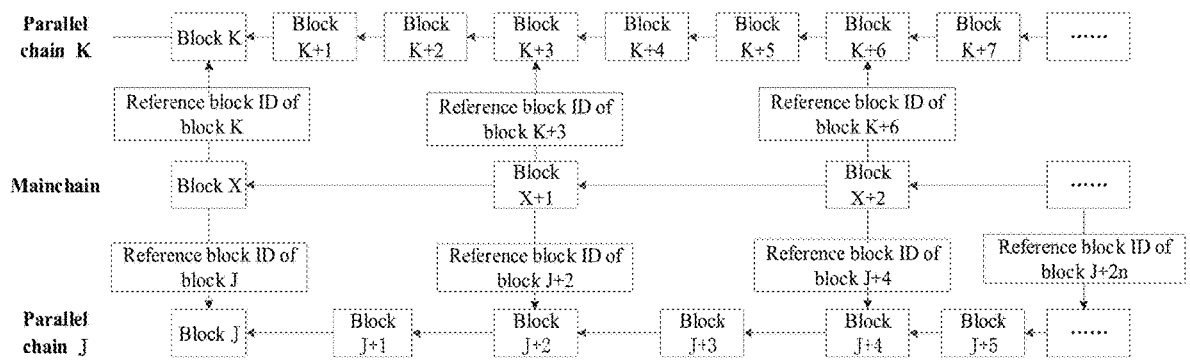

FIG. 4(a) is a flowchart of a transaction processing method for a multi-chain system according to Embodiment 2 of the present disclosure. On the basis of the above-mentioned embodiment, in this embodiment, "transmitting the slave-chain block to be confirmed on the slave-chain to the nodes of the mainchain" is further optimized into "transmitting the latest block on the slave-chain meeting the confirmation condition of the mainchain, as the slave-chain block to be confirmed, to the nodes of the mainchain". This method specifically includes the following steps.

At S401, slave-chain blocks are generated based on a slave-chain consensus mechanism, and the slave-chain blocks are stored on the slave-chain.

At S402, in response to determining that a confirmation condition of the mainchain is met, the latest block on the slave-chain meeting the confirmation condition of the mainchain is transmitted, as the slave-chain block to be confirmed, to nodes of the mainchain, to request consensus nodes of the mainchain to confirm the slave-chain block to be confirmed, and confirmation information of the slave-chain block to be confirmed is stored on the mainchain.

In this embodiment, determining that the confirmation condition of the mainchain is met may include: determining an interval between a currently generated block on the slave-chain and the last slave-chain block confirmed by the mainchain, and determining that the confirmation condition of the mainchain is met in response to the interval meeting a preset interval threshold. The interval threshold is determined according to how often the mainchain confirms one slave-chain block. For example, if the mainchain determines one slave-chain block every 5 blocks, the interval threshold is set to 5.

In other words, when the interval between the currently generated block on the slave-chain and the last slave-chain block confirmed by the mainchain reaches the preset interval threshold, it is determined that the confirmation condition of the mainchain is met.

When it is determined that the confirmation condition of the mainchain is met, the latest block in the slave-chain meeting the confirmation condition of the mainchain may be transmitted as the slave-chain block to be confirmed to the nodes of the mainchain, to request the consensus nodes of the mainchain to confirm the slave-chain block to be confirmed, and the confirmation information of the slave-chain block to be confirmed is stored on the mainchain. It should be noted that, in this embodiment, the slave-chain blocks to be confirmed include a part of the slave-chain blocks on the slave-chain. Therefore, the number of the slave-chain blocks to be confirmed is effectively reduced, which reduces the computing pressure of the consensus nodes of the mainchain.

In the actual application process, a speed of generating the slave-chain blocks by the slave-chain may be faster than that of the mainchain. That is, within a current block generating period of the consensus nodes of the mainchain, one slave-chain may transmit a plurality of slave-chain blocks to be confirmed to the mainchain, which increases the computing pressure of the consensus nodes of the mainchain, thereby affecting overall performance of the multi-chain system. For this, in embodiments of the present disclosure, the slave-chain node is controlled to transfer some blocks on the slave-chain to the nodes of the mainchain, and an interval period for the slave-chain to send the slave-chain block to be confirmed is controlled to be equal to or greater than the block generating period of the mainchain, so that the computing pressure of the consensus nodes on the mainchain is reduced. Preferably, the newly generated slave-chain block (the latest block) on the slave-chain is transferred as the slave-chain node to be confirmed to the mainchain. Other slave-chain nodes to be confirmed on the slave-chain queue up for the mainchain to perform confirmation operation. In order to meet the rhythm requirement of the mainchain to gradually confirm the slave-chain blocks, preferably, the mainchain confirms one slave-chain block of one slave-chain in each block generating period, rather than confirming a plurality of slave-chain blocks of the slave-chain. The slave-chain blocks to be confirmed in the future could be queued for confirmation until the next block generating period of the mainchain.

Based on the above illustration, the mainchain in this embodiment adopts a slow block generating speed, for example, generating one mainchain block every 6 seconds (s), and the slave-chain could freely select the block generating speed, such as for example, generating one slave-chain block every 1 s, 2 s or 3 s, thereby obtaining a higher processing speed, which not only avoids adding excessive computing pressure to the mainchain, but also achieves higher security in a case that the slave-chain has fewer consensus nodes.

Taking FIG. 4(b) as an example, the mainchain successively produces block X, block X+1, block X+2, etc. The slave-chains are a parallel chain K and a parallel chain J, the parallel chain K successively produces block K, block K+1, block K+2, etc, and the parallel chain J successively produces block J, block J+1, block J+2, etc. The parallel chain K needs to be confirmed at a 3-blocks interval. The confirmation information includes a block ID of block X referenced by block K, a block ID of block X+1 referenced by block K+3, and a block ID of block X+2 referenced by block K+6. The parallel chain J needs to be confirmed at a 2-blocks interval. The confirmation information includes a block ID of block J referenced by block X, a block ID of block J+2 referenced by block X+1, and a block ID of block J+4 referenced by block X+2.

In another embodiment of the present disclosure, the preset interval threshold may be updated according to the interval among adjacent mainchain blocks storing confirmation information on the mainchain, in which each mainchain block stores confirmation information of one slave-chain block of the slave-chain. The process is implemented in the following ways.

Way 1

If the slave-chain node is deployed with both the mainchain and the slave-chain, it means that there is a mainchain deployment system locally on the slave-chain node, then the slave-chain node obtains the mainchain block header by querying the mainchain deployment system. The interval among adjacent mainchain blocks is determined based on the confirmation information stored in the mainchain block header, and the preset interval threshold is updated.

Way 2

If the slave-chain node is not deployed with the mainchain, it means that there is no mainchain deployment system locally in the slave-chain. Then the slave-chain node may obtain the block header of the mainchain through other nodes on the slave-chain. The interval among adjacent mainchain blocks is determined based on the confirmation information stored in the obtained mainchain block header and the preset interval threshold is updated.

In this embodiment, after the slave-chain node obtains the block header of the mainchain through other nodes, the mainchain block header may be stored locally for subsequent use, and the amount of information storage is small.

It should be noted that the above two ways are only used as exemplary descriptions of the embodiments of the present disclosure, and not as specific limitations on the present disclosure.

It is understood that in this embodiment, by updating the preset interval threshold according to the interval among adjacent mainchain blocks storing confirmation information in the mainchain, dynamic adjustment is realized for the confirmation condition of performing the confirmation on slave-chain blocks generated in the slave-chain, and thus the phenomenon that the slave-chain blocks are queued for confirmation by the mainchain is avoided. In this way, the confirmation rhythm on the generated slave-chain blocks is effectively controlled, and the computing pressure of the consensus nodes in the mainchain is reduced.

In the transaction processing method for a multi-chain system according to embodiments of the present disclosure, the slave-chain blocks are generated based on the slave-chain consensus mechanism and stored on the slave-chain. In response to determining that the confirmation condition of the mainchain is met, the latest block on the slave-chain meeting the confirmation condition of the mainchain is transmitted, as the slave-chain block to be confirmed, to nodes of the mainchain, to request consensus nodes of the mainchain to confirm the slave-chain block to be confirmed, and confirmation information of the slave-chain block to be confirmed is stored on the mainchain. Therefore, the consensus nodes of the mainchain confirm the slave-chain block to be confirmed generated by the slave-chain, optimizing the consensus strategy in the multi-chain system, and moreover, by controlling the slave-chain node to transfer part of blocks in the slave-chain to the nodes of the mainchain, the calculation pressure of the consensus nodes of the mainchain is reduced, giving consideration to both the calculation pressure of the nodes of the multi-chain system and the reliability of the blockchain.

Embodiment 3

Figure 5:
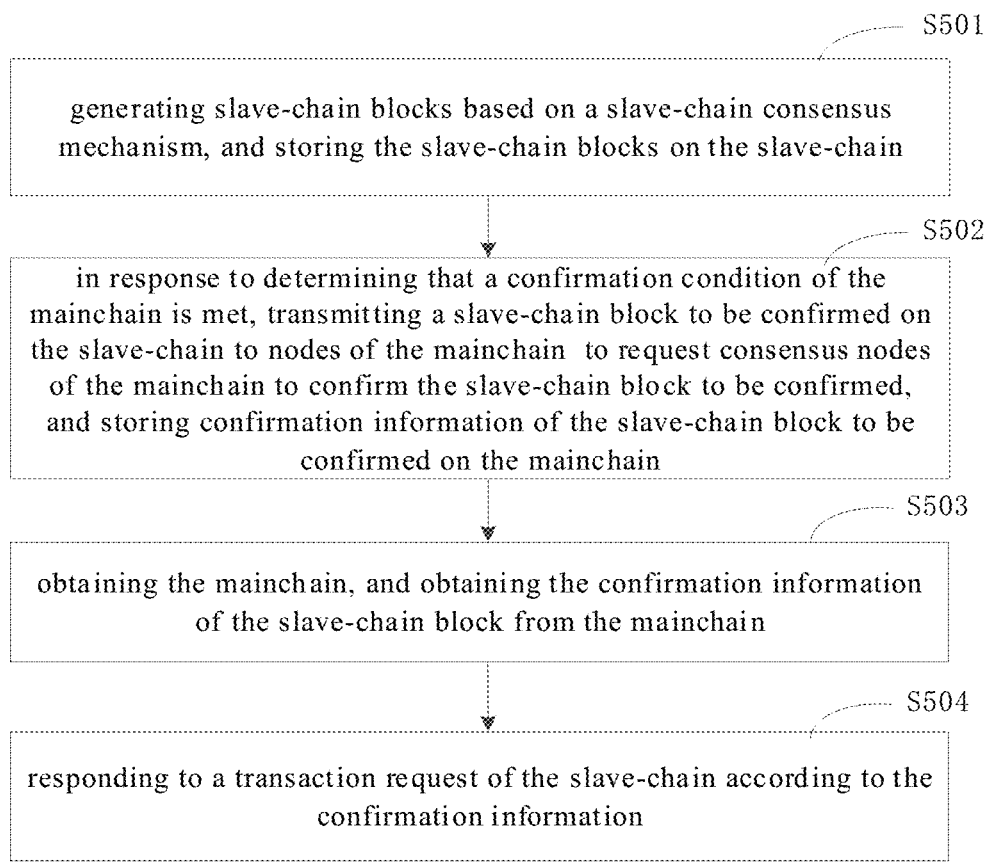
FIG. 5 is a flowchart of a transaction processing method for a multi-chain system according to Embodiment 3 of the present disclosure.

FIG. 5 is a flowchart of a transaction processing method for a multi-chain system according to Embodiment 3 of the present disclosure. This embodiment is further optimized on the basis of the above embodiments by adding "obtaining the mainchain, and obtaining the confirmation information of the slave-chain block from the mainchain; and responding to a transaction request of the slave-chain according to the confirmation information". The method specifically includes the following acts.

At S501, slave-chain blocks are generated based on a slave-chain consensus mechanism, and the slave-chain blocks are stored on the slave-chain.

At S502, in response to determining that confirmation condition of the mainchain is met, a slave-chain block to be confirmed on the slave-chain is transmitted to nodes of the mainchain, to request consensus nodes of the mainchain to confirm the slave-chain block to be confirmed, and store confirmation information of the slave-chain block to be confirmed on the mainchain.

At S503, the mainchain is obtained, and the confirmation information of the slave-chain block is obtained from the mainchain.

In this embodiment, optionally, obtaining the mainchain specifically refers to obtaining the block header of the mainchain, so that the confirmation information of the slave-chain block is obtained from the obtained mainchain block header.

For example, obtaining the block header of the mainchain in this embodiment may include the following cases.

The first case is that when the slave-chain node needs to perform transaction processing, the slave-chain node actively obtains the block header of the mainchain.

The second case is that the slave-chain passively obtains the mainchain. In detail, after the consensus nodes of the mainchain confirm the slave-chain block to be confirmed, the mainchain actively transmits its own block header to the slave-chain node.

The third case is that the slave-chain node actively obtains the block header of the mainchain once every preset interval. For example, the slave-chain node actively obtains the block header of the mainchain once every 6 blocks.

It should be noted that the above-mentioned cases of obtaining the mainchain block header are only used as exemplary descriptions of the embodiments of the present disclosure, and not as specific limitations on the present disclosure.

In this embodiment, after obtaining the block header of the mainchain, the confirmation information of the slave-chain block may be obtained from the block header of the mainchain.

At S504, a transaction request of the slave-chain is responded according to the confirmation information.

By responding to the transaction request of the slave-chain based on the confirmation information, the operation of the slave-chain is affected through the confirmation effect of the mainchain, thereby enhancing the reliability of the operation of the slave-chain.

For example, responding to the transaction request of the slave-chain according to the confirmation information includes the following cases.

In the first case, in response to a query request from a slave-chain account for an on-chain transaction request, the confirmation information of the slave-chain block to which the transaction request belongs is displayed. The displayed confirmation information may include confirmation information of the confirmed slave-chain block and information of the unconfirmed slave-chain block. That is, based on the displayed confirmation information, the user using the slave-chain account could determine by themselves whether to perform subsequent transaction processing based on the slave-chain block in a to-be-confirmed state. The higher the reliability of the slave-chain blocks confirmed by the mainchain and the transactions in the slave-chain blocks, the higher the user's confidence in the slave-chain, which is conductive to stimulating business development of the slave-chain.

In the second case, a write data object of the unconfirmed slave-chain block is set to be in a frozen state according to the confirmation information, in which the write data object in the frozen state is prohibited from responding to a newly initiated transaction request.

Generally, cost of reverse attack on the slave-chain block confirmed by the mainchain is very high, and thus the slave-chain block confirmed by the mainchain is relatively safe, whilst the slave-chain block that is not confirmed by the mainchain may be attacked by other nodes of the slave-chain and bifurcated. Therefore, in order to prevent the unconfirmed slave-chain block from being attacked, in this embodiment, the write data object of the unconfirmed slave-chain block is set to be in the frozen state, so that other nodes could not reference the unconfirmed slave-chain block when attacking the unconfirmed slave-chain block, thereby reducing the probability of malicious attacks and improving security.

The reverse attack refers to that the same user or coalition of interests controls the consensus nodes of the mainchain, so that the consensus nodes are not only few, but also have low security, which makes it easy for attackers to attack the slave-chain and cause furcation. However, if the mainchain in this embodiment adopts POW consensus, reversion or furcation could be caused only if the attacker's computing power exceeds 51% of a total computing power of the mainchain, the cost of which is really very high, since the mainchain has a largest number of consensus nodes.

For example, if the $10^{th}$ slave-chain block is not confirmed, the write data object of the $10^{th}$ slave-chain block is set to be in the frozen state, so that the $10^{th}$ slave-chain block could not be referenced, when the $11^{th}$ slave-chain block needs to reference the $10^{th}$ slave-chain block during transaction processing, thus avoiding attack and furcation. The write data object refers to the data that needs to be written during the execution of the transaction request, for example, unspent transaction output (UTXO) that needs to be rewritten in the transfer transactions. The write data object is prohibited from being referenced by other transaction requests, specifically, could not be used as read data or write data of other transaction requests.

In the transaction processing method for a multi-chain system according to the embodiments of the present disclosure, the slave-chain blocks are generated based on the slave-chain consensus mechanism and stored on the slave-chain. In response to determining that the confirmation condition of the mainchain is met, the slave-chain block to be confirmed on the slave-chain is transmitted to the mainchain node to request the consensus node of the mainchain to confirm the slave-chain block to be confirmed, and the confirmation information of the slave-chain block to be confirmed is stored on the mainchain. the mainchain is obtained, and the confirmation information of the slave-chain block is obtained from the mainchain, and the transaction request of the slave-chain is responded to according to the confirmation information. Therefore, the consensus nodes of the mainchain realize confirming the slave-chain block to be confirmed generated by the slave-chain, to optimize the consensus strategy in the multi-chain system, which takes into account both the calculation pressure of the nodes of the multi-chain system and reliability and security of the blockchains.

Embodiment 4

In the following, the mainchain node deployed with the mainchain in the multi-chain system is used as an execution subject to describe the transaction processing method for the multi-chain system according to embodiments of the present disclosure.

Figure 6:
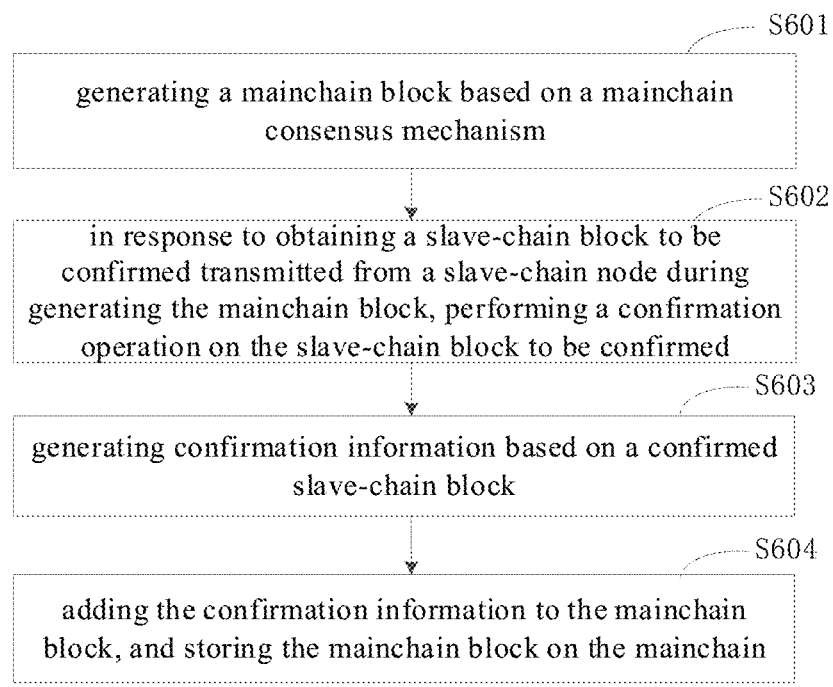
FIG. 6 is a flowchart of a transaction processing method for a multi-chain system according to Embodiment 4 of the present disclosure.

FIG. 6 is a flowchart of a transaction processing method for a multi-chain system according to Embodiment 4 of the present disclosure. The transaction processing method for the multi-chain system provided by this embodiment may be executed by a transaction processing apparatus for a multi-chain system in the mainchain node. The apparatus may be implemented by software and/or hardware, and may be configured in an electronic device. The method includes the following steps.

At S601, a mainchain block is generated based on a mainchain consensus mechanism.

For example, based on the consensus mechanism of the mainchain, a block generating node is determined from the consensus nodes of the mainchain, and the mainchain block is generated by the block generating node, and the mainchain block is confirmed by other consensus nodes, and the confirmation information is stored on the mainchain. Different consensus nodes in the mainchain are selected in turn as the block generating node to generate the mainchain block. The specific implementation process will not be repeated.

At S602, in response to obtaining a slave-chain block to be confirmed transmitted from a slave-chain node during generating the mainchain block, a confirmation operation is performed on the slave-chain block to be confirmed.

In the process of generating the mainchain block, if the consensus node of the mainchain obtains the slave-chain block to be confirmed, the confirmation operation is performed on the slave-chain block to be confirmed. The confirmation operation generally refers to the confirmation of legality and correctness of the slave-chain block.

Optionally, in response to obtaining the slave-chain block to be confirmed transmitted from the slave-chain node, performing the confirmation operation on the slave-chain block to be confirmed includes: in response to obtaining the slave-chain blocks to be confirmed transmitted from the slave-chain nodes, performing the confirmation operation on the earliest slave-chain block to be confirmed from the plurality of slave-chain blocks to be confirmed transmitted by nodes of one of the slave-chains in a generation period of the current mainchain block. In this embodiment, by selecting the earliest slave-chain block to be confirmed for the confirmation operation, the confirmation operation is performed on one slave-chain block to be confirmed of one slave-chain in each block generating period of the mainchain, and if a plurality of slave-chain blocks to be confirmed are received, following slave-chain blocks are queued up for confirmation until the next block generating period, thereby reducing the computing pressure of the consensus nodes of the mainchain.

In detail, performing the confirmation operation on the slave-chain block to be confirmed includes at least one of following operations:

executing a transaction request based on a deployment system of the slave-chain according to the transaction request stored in a block body of the slave-chain block to be confirmed, to obtain corresponding transaction data, and matching and confirming the acquired transaction data according to the Merkel Tree stored in the block header of the slave-chain block to be confirmed;

matching and confirming the transaction data stored in the block body of the slave-chain block to be confirmed according to the Merkel Tree stored in the block header of the slave-chain block to be confirmed; and performing signature verification according to an account signature in the slave-chain block to be confirmed.

In this embodiment, if there is a deployment system of the slave-chain locally on the mainchain, the transaction requests in the block body of the slave-chain block to be confirmed are executed one by one through the deployment system of the slave-chain to obtain the transaction data, and then a transaction identifier is obtained based on the transaction data, and then the Merkel Tree composed of all transaction identifiers in the slave-chain block is determined. The Merkle Tree stored in the block header of the slave-chain block to be confirmed is verified according to the determined Merkel Tree, and the verification result is obtained. The verification results include: legal verification and illegal verification. That is, the consensus nodes of the mainchain are deployed with the data of the slave-chain to confirm the slave-chain block to be confirmed, which more accurately determine whether the slave-chain block to be confirmed is legal and improve the reliability of confirmation.

If the mainchain does not have a deployment system of the slave-chain locally, the Merkle Tree in the block header of the slave-chain to be confirmed may be verified based on the transaction identifier of each transaction data in the slave-chain block to be confirmed; or, verification may be performed on an account signature of the transaction request in the slave-chain block to be confirmed to complete the confirmation. That is, the consensus nodes of the mainchain may perform the confirmation without being deployed with the data of the slave-chain. The calculation amount of this scheme is smaller.

At S603, confirmation information is generated based on a confirmed slave-chain block.

At step S604, the confirmation information is added to the mainchain block, and the mainchain block is stored on the mainchain.

For example, for the slave-chain blocks to be confirmed of each slave-chain, the block identifiers of the confirmed slave-chain blocks of the slave-chain and the chain identifier of the slave-chain are obtained. A Merkle Tree is generated by using the block identifiers and the chain identifier of each slave-chain as a set of leaf nodes, and the confirmation information is determined as the Merkel Tree. Then, the Merkel Tree is added to the mainchain block, and the mainchain block is stored on the mainchain.

In the transaction processing method for a multi-chain system according to embodiments of the present disclosure, a mainchain block is generated based on a mainchain consensus mechanism, a confirmation operation is performed on the slave-chain block to be confirmed In response to obtaining a slave-chain block to be confirmed transmitted from a slave-chain node during generating the mainchain block, and confirmation information is generated based on a confirmed slave-chain block, and the confirmation information is added to the mainchain block, and the mainchain block is stored on the mainchain. Therefore, the consensus nodes of the mainchain confirm the slave-chain block to be confirmed generated by the slave-chain, thereby optimizing the consensus strategy in the multi-chain system and taking into account both the calculation pressure of the nodes of the multi-chain system and the reliability of the blockchains.

Embodiment 5

Figure 7:
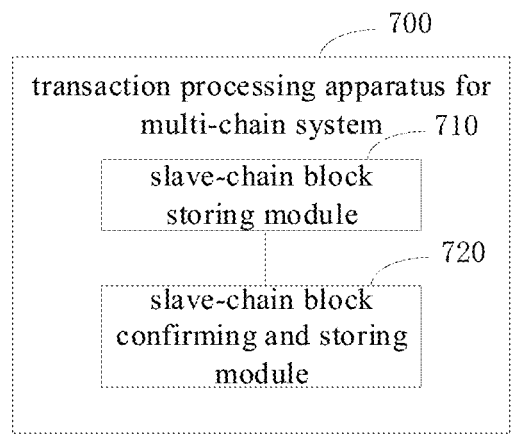
FIG. 7 is a schematic diagram of a transaction processing apparatus for a multi-chain system according to Embodiment 5 of the present disclosure.

FIG. 7 is a schematic diagram of a transaction processing apparatus for a multi-chain system according to Embodiment 5 of the present disclosure. The multi-chain system includes a mainchain and at least one slave-chain, a multi-chain network of the multi-chain system includes a plurality of nodes, and each node is deployed with one or more of the mainchain and the slave-chains. The apparatus is provided in a slave-chain node deployed with the slave-chain, which may be implemented by software and/or hardware, and configured in an electronic device. As illustrated in FIG. 7, the transaction processing apparatus 700 for the multi-chain system according to embodiments of the present disclosure includes a slave-chain block storing module 710 and a slave-chain block confirming and storing module 720.

The slave-chain block storing module 710 is configured to generate slave-chain blocks based on a slave-chain consensus mechanism, and store the slave-chain blocks on the slave-chain. The slave-chain block confirming and storing module 720 is configured to, in response to determining that a confirmation condition of the mainchain is met, transmit a slave-chain block to be confirmed on the slave-chain to nodes of the mainchain to request consensus nodes of the mainchain to confirm the slave-chain block to be confirmed, and store confirmation information of the slave-chain block to be confirmed on the mainchain.

As an optional implementation of embodiments of the present disclosure, the slave-chain blocks to be confirmed include a part of the slave-chain blocks on the slave-chain.

As an optional implementation of embodiments of the present disclosure, the slave-chain block confirming and storing module 720 includes a slave-chain block transmitting module. The slave-chain block transmitting module is configured to transmit the latest block on the slave-chain meeting the confirmation conditions of the mainchain, as the slave-chain block to be confirmed, to the mainchain node.

As an optional implementation of embodiments of the present disclosure, the slave-chain block confirming and storing module 720 is further configured to: determine an interval between a currently generated block on the slave-chain and the last slave-chain block confirmed by the mainchain, and determine that the confirmation condition of the mainchain is met in response to the interval meeting a preset interval threshold.

As an optional implementation of embodiments of the present disclosure, the apparatus includes a threshold updating module. The threshold updating module is configured to update the preset interval threshold according to intervals between adjacent mainchain blocks configured to store the confirmation information on the mainchain, in which each mainchain block is configured to store the confirmation information of one slave-chain block of the slave-chain.

As an optional implementation of embodiments of the present disclosure, an interval period of transmitting the slave-chain block to be confirmed by the slave-chain is equal to or greater than a block generating period of the mainchain.

As an optional implementation of embodiments of the present disclosure, the apparatus further includes: an information obtaining module and a request responding module.

The information obtaining module is configured to obtain the mainchain, and obtain the confirmation information of the slave-chain block from the mainchain.

The request responding module is configured to respond to a transaction request of the slave-chain according to the confirmation information.

As an optional implementation of embodiments of the present disclosure, the information obtaining module further is configured to obtain a block header of the mainchain, and obtain the confirmation information of the slave-chain block from the block header of the mainchain.

As an optional implementation of embodiments of the present disclosure, the request responding module is further configured to: in response to a query request for the transaction request stored on the chain from a slave-chain account, display the confirmation information of the slave-chain block to which the transaction request belongs; or set a write data object of an unconfirmed slave-chain block to be in a frozen state according to the confirmation information, in which the write data object in the frozen state is prohibited from responding to a newly initiated transaction request.

As an optional implementation of embodiments of the present disclosure, the confirmation information includes a block identifier of the slave-chain block to be confirmed and a chain identifier of the slave-chain. The block identifier and the chain identifier are used as two leaf nodes for determining a Merkle Tree, and the block identifiers of the slave-chain blocks to be confirmed and the chain identifiers of other slave-chains are used as other leaf nodes for determining the Merkle Tree. The Merkle Tree is stored in a block header of the mainchain.

As an optional implementation of embodiments of the present disclosure, the apparatus further includes a rollback control module. The rollback controlling module is configured to in response to determining that the slave-chain block on the slave-chain has a rollback requirement, prohibit a rollback operation of the slave-chain block to be rolled back located before the last slave-chain block confirmed by the mainchain.

It should be noted that the foregoing explanation of the embodiments of the transaction processing method for the multi-chain system is also applicable to the transaction processing apparatus for the multi-chain system of this embodiment, and the implementation principle is similar, which will not be repeated here.

With the transaction processing apparatus for the multi-chain system according to the embodiments of the present disclosure, the slave-chain blocks are generated based on the slave-chain consensus mechanism and stored on the slave-chain. In response to determining that the confirmation condition of the mainchain is met, the slave-chain block to be confirmed on the slave-chain is transmitted to nodes of the mainchain to request the consensus nodes of the mainchain to confirm the slave-chain block to be confirmed, and the confirmation information of the slave-chain block to be confirmed is stored on the mainchain. Therefore, the slave-chain blocks generated by the slave-chain are confirmed based on the consensus nodes of the mainchain, optimizing the consensus strategy in the multi-chain system, and taking into account both the calculation pressure of the nodes of the multi-chain system and the reliability of the blockchains.

Embodiment 6

Figure 8:
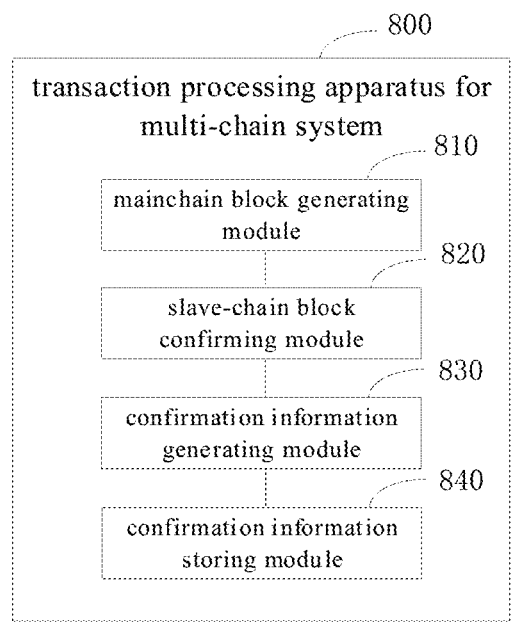
FIG. 8 is a schematic diagram of a transaction processing apparatus for a multi-chain system according to Embodiment 6 of the present disclosure.

FIG. 8 is a schematic diagram of a transaction processing apparatus for a multi-chain system according to Embodiment 6 of the present disclosure. The multi-chain system includes a mainchain and at least one slave-chain, a multi-chain network of the multi-chain system includes a plurality of nodes, and each node is deployed with one or more of the mainchain and the slave-chains. The apparatus is provided in a slave-chain node deployed with the slave-chain, which may be implemented by software and/or hardware, and configured in an electronic device. As illustrated in FIG. 8, the transaction processing apparatus 800 for the multi-chain system according to embodiments of the present disclosure includes: a mainchain block generating module 810, a slave-chain block confirming module 820, a confirmation information generating module 830 and a confirmation information storing module 840.

The mainchain block generating module 810 is configured to generate a mainchain block based on a mainchain consensus mechanism. The slave-chain block confirming module 820 is configured to in response to obtaining a slave-chain block to be confirmed transmitted from a slave-chain node during generating the mainchain block, perform a confirmation operation on the slave-chain block to be confirmed. The confirmation information generating module 830 is configured to generate confirmation information based on a confirmed slave-chain block. The confirmation information storing module 840 is configured to add the confirmation information to the mainchain block, and store the mainchain block on the mainchain.

As an optional implementation of embodiments of the present disclosure, the slave-chain block confirming module 820 is further configured to, in response to obtaining the slave-chain blocks to be confirmed transmitted from the slave-chain nodes, perform the confirmation operation on the earliest slave-chain block to be confirmed from the slave-chain blocks to be confirmed transmitted by nodes of one of the slave-chains in a generation period of the current mainchain block.

As an optional implementation of embodiments of the present disclosure, the slave-chain block confirming module 820 is further configured for at least one of: executing a transaction request based on a deployment system of the slave-chain according to the transaction request stored in a block body of the slave-chain block to be confirmed, to obtain corresponding transaction data, and matching and confirming the acquired transaction data according to a Merkel Tree stored in a block header of the slave-chain block to be confirmed; matching and confirming the transaction data stored in the block body of the slave-chain block to be confirmed according to the Merkel Tree stored in the block header of the slave-chain block to be confirmed; and performing signature verification based on an account signature in the slave-chain block to be confirmed.

As an optional implementation of embodiments of the present disclosure, the confirmation information generating module 830 is further configured to: for the slave-chain blocks to be confirmed of each slave-chain, obtain block identifiers of the confirmed slave-chain blocks of each slave-chain and the chain identifier of the slave-chain; and generate a Merkle Tree by using the block identifiers and the chain identifier of each slave-chain as a set of leaf nodes, and determine the confirmation information as the Merkel Tree.

It should be noted that the foregoing explanation of the embodiments of the transaction processing method for the multi-chain system is also applicable to the transaction processing apparatus for the multi-chain system of this embodiment, and the implementation principle is similar, which will not be repeated here.

With the transaction processing apparatus for the multi-chain system according to embodiments of the present disclosure, a mainchain block is generated based on a mainchain consensus mechanism, and in response to obtaining a slave-chain block to be confirmed transmitted from a slave-chain node during generating the mainchain block, a confirmation operation is performed on the slave-chain block to be confirmed. Confirmation information is generated based on a confirmed slave-chain block, and the confirmation information is added to the mainchain block, and the mainchain block is stored on the mainchain. Therefore, the slave-chain blocks generated by the slave-chain are confirmed based on the consensus nodes of the mainchain, optimizing the consensus strategy in the multi-chain system, and taking into account both the calculation pressure of the nodes of the multi-chain system and the reliability of the blockchains.

Embodiment 7

According to embodiments of the present disclosure, the present disclosure also provides an electronic device and a readable storage medium.

Figure 9:
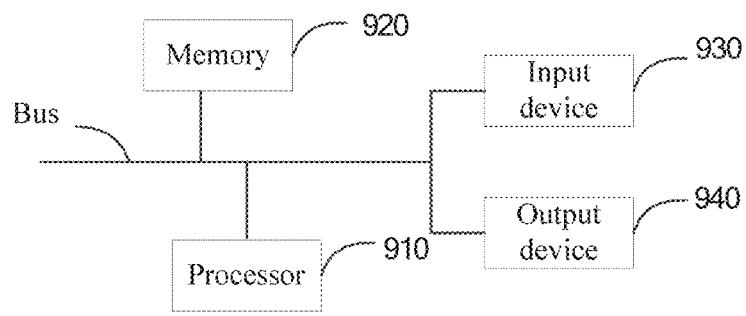
FIG. 9 is a schematic diagram of an electronic device according to Embodiment 7 of the present disclosure.

FIG. 9 is a schematic diagram of an electronic device according to embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 9, the electronic device includes: one or more processors 910, a memory 920, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 910 is taken as an example in FIG. 9.

The memory 920 is a non-transitory computer-readable storage medium according to the present disclosure. The memory stores instructions executable by at least one processor, so that the at least one processor executes the transaction processing method for the multi-chain system according to the present disclosure. The non-transitory computer-readable storage medium of the present disclosure stores computer instructions, which are used to cause a computer to execute the transaction processing method for the multi-chain system according to the present disclosure.

As a non-transitory computer-readable storage medium, the memory 920 is configured to store non-transitory software programs, non-transitory computer executable programs and modules, such as program instructions/modules corresponding to the transaction processing method for the multi-chain system in the embodiment of the present disclosure (For example, the slave-chain block storing module 710 and the slave-chain block confirming and storing module 720 shown in FIG. 7, or the mainchain block generating module 810, the slave-chain block confirming module 820, and the confirmation information generating module 830 and the confirmation information storing module 840 shown in FIG. 8). The processor 910 executes various functional applications and data processing of the server by running non-transitory software programs, instructions, and modules stored in the memory 920, that is, implementing the transaction processing method for the multi-chain system in the foregoing method embodiment.

The memory 920 may include a storage program area and a storage data area, where the storage program area may store an operating system and application programs required for at least one function. The storage data area may store data created according to the use of the electronic device, and the like. In addition, the memory 920 may include a high-speed random access memory, and a non-transitory memory, such as at least one magnetic disk storage device, a flash memory device, or other non-transitory solid-state storage device. In some embodiments, the memory 920 may optionally include a memory remotely disposed with respect to the processor 910, and these remote memories may be connected to the electronic device through a network. Examples of the above network include, but are not limited to, the Internet, an intranet, a local area network, a mobile communication network, and combinations thereof.

The electronic device for implementing the transaction processing method for the multi-chain system may further include: an input device 930 and an output device 940. The processor 910, the memory 920, the input device 930, and the output device 940 may be connected through a bus or in other manners. In FIG. 9, the connection through the bus is taken as an example.

The input device 930 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 940 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

The embodiments of the present disclosure further provide a multi-chain network deployed with a multi-chain system, the multi-chain network includes a mainchain and at least one slave-chain, the multi-chain network includes a plurality of nodes, each node is deployed with one or more of the mainchain and the slave-chains, and at least part of the nodes includes: at least one processor and a memory communicatively connected to the at least one processor. The memory stores instructions executable by the at least one processor, and when the instructions are executed by the at least one processor, the at least one processor is caused to execute the transaction processing method for the multi-chain system according to any embodiment.

In detail, for hardware structure and function of the multi-chain network refer to the explanation of Embodiment 7.

According to the technical solution of the present disclosure, the consensus node of the mainchain confirms the slave-chain block to be confirmed generated by the slave-chain, to optimize consensus strategies in the multi-chain system and take into account calculation pressure of the nodes of the multi-chain system and reliability of the blockchains.

It should be understood that various forms of processes shown above may be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A transaction processing method for a multi-chain system, wherein the multi-chain system comprises a mainchain and at least one slave-chain, a multi-chain network of the multi-chain system comprises a plurality of nodes, each node is deployed with one or more of the mainchain and the slave-chains, and the method is executed by a slave-chain node deployed with the slave-chain, and the method comprises:
    generating slave-chain blocks based on a slave-chain consensus mechanism, and storing the slave-chain blocks on the slave-chain; and
    in response to determining that a confirmation condition of the mainchain is met, transmitting a slave-chain block to be confirmed on the slave-chain to nodes of the mainchain to request consensus nodes of the mainchain to confirm the slave-chain block to be confirmed, and storing confirmation information of the slave-chain block to be confirmed on the mainchain,
        wherein determining that the confirmation condition of the mainchain is met comprises:
        determining an interval between a currently generated block on the slave-chain and the last slave-chain block confirmed by the mainchain, and determining that the confirmation condition of the mainchain is met in response to the interval meeting a preset interval threshold,
        wherein an interval period of transmitting the slave-chain block to be confirmed by the slave-chain is equal to or greater than a block generating period of the mainchain.

2. The method according to claim 1, wherein the slave-chain blocks to be confirmed include a part of the slave-chain blocks on the slave-chain.

3. The method according to claim 2, wherein transmitting the slave-chain block to be confirmed on the slave-chain to the nodes of the mainchain comprises:
    transmitting the latest block on the slave-chain meeting the confirmation condition of the mainchain, as the slave-chain block to be confirmed, to the mainchain node.

4. The method according to claim 1, further comprising:
    updating the preset interval threshold according to an interval between adjacent mainchain blocks configured to store the confirmation information on the mainchain, wherein each mainchain block is configured to store the confirmation information of one slave-chain block of the slave-chain.

5. The method according to claim 1, further comprising:
    obtaining the mainchain, and obtaining the confirmation information of the slave-chain block from the mainchain; and
    responding to a transaction request of the slave-chain according to the confirmation information.

6. The method according to claim 5, wherein obtaining the mainchain and obtaining the confirmation information of the slave-chain block from the mainchain comprises:
    obtaining a block header of the mainchain, and obtaining the confirmation information of the slave-chain block from the block header of the mainchain.

7. The method according to claim 5, wherein responding to the transaction request of the slave-chain according to the confirmation information comprises:

in response to a query request for the transaction request stored on the chain from a slave-chain account, displaying the confirmation information of the slave-chain block to which the transaction request belongs; or setting a write data object of an unconfirmed slave-chain block to be in a frozen state according to the confirmation information, wherein the write data object in the frozen state is prohibited from responding to a newly initiated transaction request.

8. The method according to claim 1, wherein the confirmation information comprises a block identifier of the slave-chain block to be confirmed and a chain identifier of the slave-chain;

the block identifier and the chain identifier are used as two leaf nodes for determining a Merkle Tree, and the block identifiers of the slave-chain blocks to be confirmed and the chain identifiers of other slave-chains are used as other leaf nodes for determining the Merkle Tree; and the Merkle Tree is stored in a block header of the mainchain.

9. The method according to claim 1, further comprising:
in response to determining that the slave-chain block on the slave-chain has a rollback requirement, prohibiting a rollback operation of the slave-chain block to be rolled back located before the last slave-chain block confirmed by the mainchain.

10. A transaction processing method for a multi-chain system, wherein the multi-chain system comprises a mainchain and at least one slave-chain, a multi-chain network of the multi-chain system comprises a plurality of nodes, each node is deployed with one or more of the mainchain and the slave-chains, and the method is executed by a mainchain node deployed with the mainchain, and the method comprises:

generating a mainchain block based on a mainchain consensus mechanism;

in response to determining that a confirmation condition of the mainchain is met, and in response to obtaining a slave-chain block to be confirmed transmitted from a slave-chain node during generating the mainchain block, performing a confirmation operation on the slave-chain block to be confirmed;

generating confirmation information based on a confirmed slave-chain block; and adding the confirmation information to the mainchain block, and storing the mainchain block on the mainchain, wherein determining that the confirmation condition of the mainchain is met comprises:

determining an interval between a currently generated block on the slave-chain and the last slave-chain block confirmed by the mainchain, and determining that the confirmation condition of the mainchain is met in response to the interval meeting a preset interval threshold, wherein an interval period of transmitting the slave-chain block to be confirmed by the slave-chain is equal to or greater than a block generating period of the mainchain.

11. The method according to claim 10, wherein in response to obtaining the slave-chain block to be confirmed transmitted from the slave-chain node, performing the confirmation operation on the slave-chain block to be confirmed comprises:

in response to obtaining the slave-chain blocks to be confirmed transmitted from the slave-chain nodes, performing the confirmation operation on the earliest slave-chain block to be confirmed from the slave-chain blocks to be confirmed transmitted by nodes of one of the slave-chains in a generation period of the current mainchain block.

12. The method according to claim 10, wherein performing the confirmation operation on the slave-chain block to be confirmed comprises at least one of:

executing a transaction request based on a deployment system of the slave-chain according to the transaction request stored in a block body of the slave-chain block to be confirmed, to obtain corresponding transaction data, and matching and confirming the acquired transaction data according to a Merkel Tree stored in a block header of the slave-chain block to be confirmed;

matching and confirming the transaction data stored in the block body of the slave-chain block to be confirmed according to the Merkel Tree stored in the block header of the slave-chain block to be confirmed; and performing signature verification based on an account signature in the slave-chain block to be confirmed.

13. The method according to claim 10, wherein generating the confirmation information based on the confirmed slave-chain block comprises:

for the slave-chain blocks to be confirmed of each slave-chain, obtaining block identifiers of the confirmed slave-chain blocks of each slave-chain and the chain identifier of the slave-chain; and generating a Merkle Tree by using the block identifiers and the chain identifier of each slave-chain as a set of leaf nodes, and determining the confirmation information as the Merkel Tree.

14. An electronic device, comprising:
at least one processor; and
a memory communicatively connected to the at least one processor; wherein,
the memory is stored with instructions executable by the at least one processor, and when the instructions are executed by the at least one processor, the at least one processor is caused to execute operations of a transaction processing method for a multi-chain system, the operations comprising:

generating slave-chain blocks based on a slave-chain consensus mechanism, and storing the slave-chain blocks on the slave-chain; and in response to determining that a confirmation condition of the mainchain is met, transmitting a slave-chain block to be confirmed on the slave-chain to nodes of the mainchain to request consensus nodes of the mainchain to confirm the slave-chain block to be confirmed, and storing confirmation information of the slave-chain block to be confirmed on the mainchain, wherein determining that the confirmation condition of the mainchain is met comprises:

determining an interval between a currently generated block on the slave-chain and the last slave-chain block confirmed by the mainchain, and determining that the confirmation condition of the mainchain is met in response to the interval meeting a preset interval threshold, wherein an interval period of transmitting the slave-chain block to be confirmed by the slave-chain is equal to or greater than a block generating period of the mainchain.

15. The electronic device according to claim 14, wherein transmitting the slave-chain block to be confirmed on the slave-chain to the nodes of the mainchain comprises:

transmitting the latest block on the slave-chain meeting the confirmation condition of the mainchain, as the slave-chain block to be confirmed, to the mainchain node.

16. The electronic device according to claim 14, wherein determining that the confirmation condition of the mainchain is met comprises:
determining an interval between a currently generated block on the slave-chain and the last slave-chain block confirmed by the mainchain, and determining that the confirmation condition of the mainchain is met in response to the interval meeting a preset interval threshold.

17. The electronic device according to claim 16, wherein the operations further comprise:
updating the preset interval threshold according to an interval between adjacent mainchain blocks configured to store the confirmation information on the mainchain, wherein each mainchain block is configured to store the confirmation information of one slave-chain block of the slave-chain.

18. The electronic device according to claim 14, wherein the operations further comprise:
obtaining the mainchain, and obtaining the confirmation information of the slave-chain block from the mainchain; and
responding to a transaction request of the slave-chain according to the confirmation information.

* * * * *